United States Patent
Chung et al.

(10) Patent No.: US 12,014,031 B1
(45) Date of Patent: Jun. 18, 2024

(54) LAUNDRY APPLIANCE IDENTIFICATION SYSTEMS AND METHODS

(71) Applicant: Haier US Appliance Solutions, Inc., Wilmington, DE (US)

(72) Inventors: MyungGeon Chung, Seoul (KR); Jongdeok Jang, Incheon (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 18/093,538

(22) Filed: Jan. 5, 2023

(51) Int. Cl.
| | |
|---|---|
| G06F 3/048 | (2013.01) |
| D06F 31/00 | (2006.01) |
| D06F 34/04 | (2020.01) |
| D06F 34/28 | (2020.01) |
| G06F 3/0484 | (2022.01) |

(52) U.S. Cl.
CPC ............ G06F 3/0484 (2013.01); D06F 31/00 (2013.01); D06F 34/04 (2020.02); D06F 34/28 (2020.02); G06F 3/048 (2013.01)

(58) Field of Classification Search
None
See application file for complete search history.

(56) References Cited

U.S. PATENT DOCUMENTS

| | | | |
|---|---|---|---|
| 11,098,430 B2 | 8/2021 | Belveal et al. | |
| 2015/0156075 A1* | 6/2015 | Gist | H04L 41/22 |
| | | | 709/201 |
| 2019/0068393 A1* | 2/2019 | Lee | G06V 10/255 |
| 2021/0329165 A1* | 10/2021 | Liu | G06F 21/6245 |
| 2021/0381152 A1 | 12/2021 | Belveal et al. | |

FOREIGN PATENT DOCUMENTS

| | | |
|---|---|---|
| CN | 101964098 A | 2/2011 |
| CN | 108053574 A | 5/2018 |
| CN | 105763652 B | 5/2019 |

(Continued)

OTHER PUBLICATIONS

"Laundry Design Services" Published in Jan. 2017 chrome-extension://efaidnbmnnnibpcajpcglclefindmkaj/https://altimusdistributing.com/wp-content/uploads/2016/12/SQ-LAUNDRY-DESIGN-1-1-17.pdf (Year: 2017).*

(Continued)

*Primary Examiner* — Rinna Yi
(74) *Attorney, Agent, or Firm* — Dority & Manning, P.A.

(57) ABSTRACT

A method of identifying a laundry appliance of a group of laundry appliances includes receiving an upload including a floor plan of a room. The group of laundry appliances is located in the room. In addition, the floor plan includes location information of each laundry appliance. The method further includes providing a user notification in response to receiving the upload. The user notification may be provided on a remote user interface device. The method additionally includes displaying an image of the room in response to an affirmative action to the user notification. The image may be displayed on the remote user interface device. The method further includes receiving an input. The input may be received on the remote user interface device. In addition, the input may include an association of the laundry appliance in the image of the room with the location information of the laundry appliance.

10 Claims, 11 Drawing Sheets

(56) References Cited

FOREIGN PATENT DOCUMENTS

| | | |
|---|---|---|
| CN | 110241553 A | 9/2019 |
| CN | 109267289 B | 2/2021 |
| JP | 2021107998 A | 7/2021 |
| TW | M512037 U | 11/2015 |

OTHER PUBLICATIONS

"Stony Brook Laundry 101" https://www.youtube.com/watch?v=DL9EibH7KUU Uploaded on Mar. 6, 2019 (Year: 2019).*
"LaundryView: The Ultimate Test" Published on Nov. 7, 2007 https://www.youtube.com/watch?v=ZaPrpvtl-Po.*

* cited by examiner

LAUNDRY APPLIANCE IDENTIFICATION SYSTEMS AND METHODS

FIELD

The present matter relates generally to laundry appliances and more particularly to a method of identifying a laundry appliance of a group of laundry appliances.

BACKGROUND

Laundry appliances generally include washing machine appliances and dryer appliances. Such laundry appliances may be organized in groups, e.g., with multiple washing machine appliances and multiple dryer appliances in the group. For example, such groups may be found in a room, e.g., a laundromat, dormitory, or apartment building. In some instances, the room having the group of laundry appliances located therein may be monitored by a camera, such as a surveillance camera. Such monitoring may provide an image of the room, and some or all of the laundry appliances in the group of laundry appliances may be visible in the image.

Typically, only general location information of each laundry appliance of the group of laundry appliances may be known. For example, such general location information may be limited to a name of a building, room, or floor that the group of laundry appliances may be located in. However, it may be desirable to identify a specific laundry appliance and provide exact location information of one or more of the laundry appliances in the area, e.g., building, floor, or room. For example, such exact location information may include relative position of a specific laundry appliance, such as relative to other laundry appliances in the area and/or relative to other fixtures or features such as doors or windows.

As such, it is desired in the art to provide improved systems and methods for identifying a laundry appliance.

BRIEF DESCRIPTION

Aspects and advantages of the invention will be set forth in part in the following description, or may be apparent from the description, or may be learned through practice of the invention.

In one exemplary embodiment, a method of identifying a laundry appliance of a group of laundry appliances is provided. The method includes receiving an upload including a floor plan of a room. The group of laundry appliances may be located in the room. The floor plan includes location information of each laundry appliance. The method also includes providing a user notification. The user notification may be provided on a remote user interface device in response to receiving the upload. The method further includes displaying an image of the room in response to an affirmative action to the user notification. The image may be displayed on the remote user interface device. The method also includes receiving an input. The input may be received on the remote user interface device. The input may include an association of the laundry appliance in the image of the room with the location information of the laundry appliance.

In another exemplary embodiment, a method of identifying a laundry appliance of a group of laundry appliances is provided. The method includes receiving location information for each laundry appliance of the group of laundry appliances. The group of laundry appliances may be located in a room. The method also includes displaying an image of the room. The image may be displayed on a remote user interface device. The method further includes receiving an input on the remote user interface device. The input may include an association of the laundry appliance in the image of the room with the location information of the laundry appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
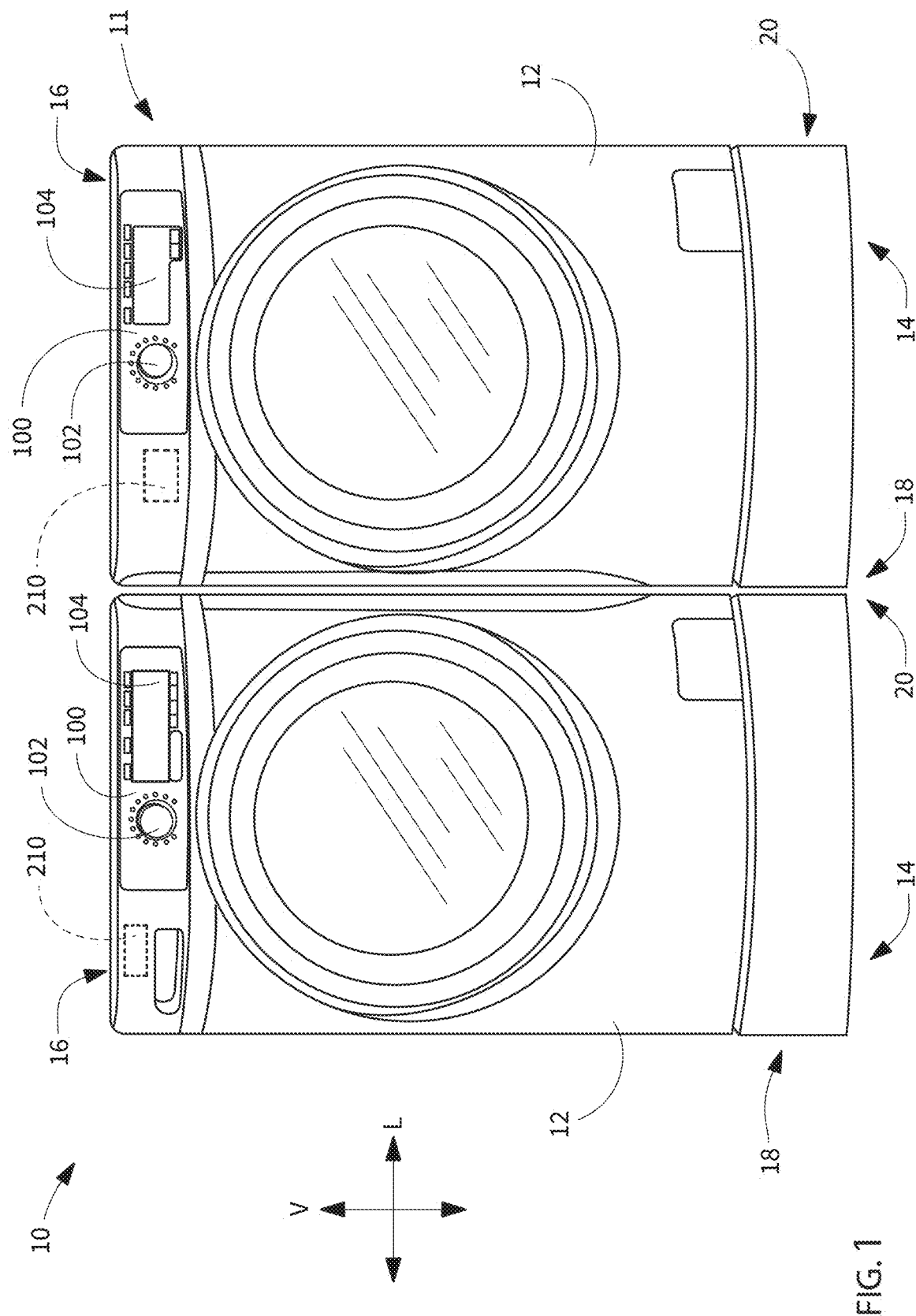
FIG. 1 provides a front view of an exemplary washing machine appliance and an exemplary dryer appliance in accordance with one or more exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent margin (±10%).

As used herein, the terms "clothing" or "articles" include but need not be limited to fabrics, textiles, garments, linens, papers, or other items from which the extraction of moisture is desirable. Furthermore, the term "load" or "laundry load" refers to the combination of clothing that may be washed together in a washing machine appliance, e.g., washing machine appliance 10, or dried together in a clothes dryer (e.g., dryer appliance 11) and may include a mixture of different or similar articles of clothing of different or similar types and kinds of fabrics, textiles, garments and linens within a particular laundering process.

Figure 2:
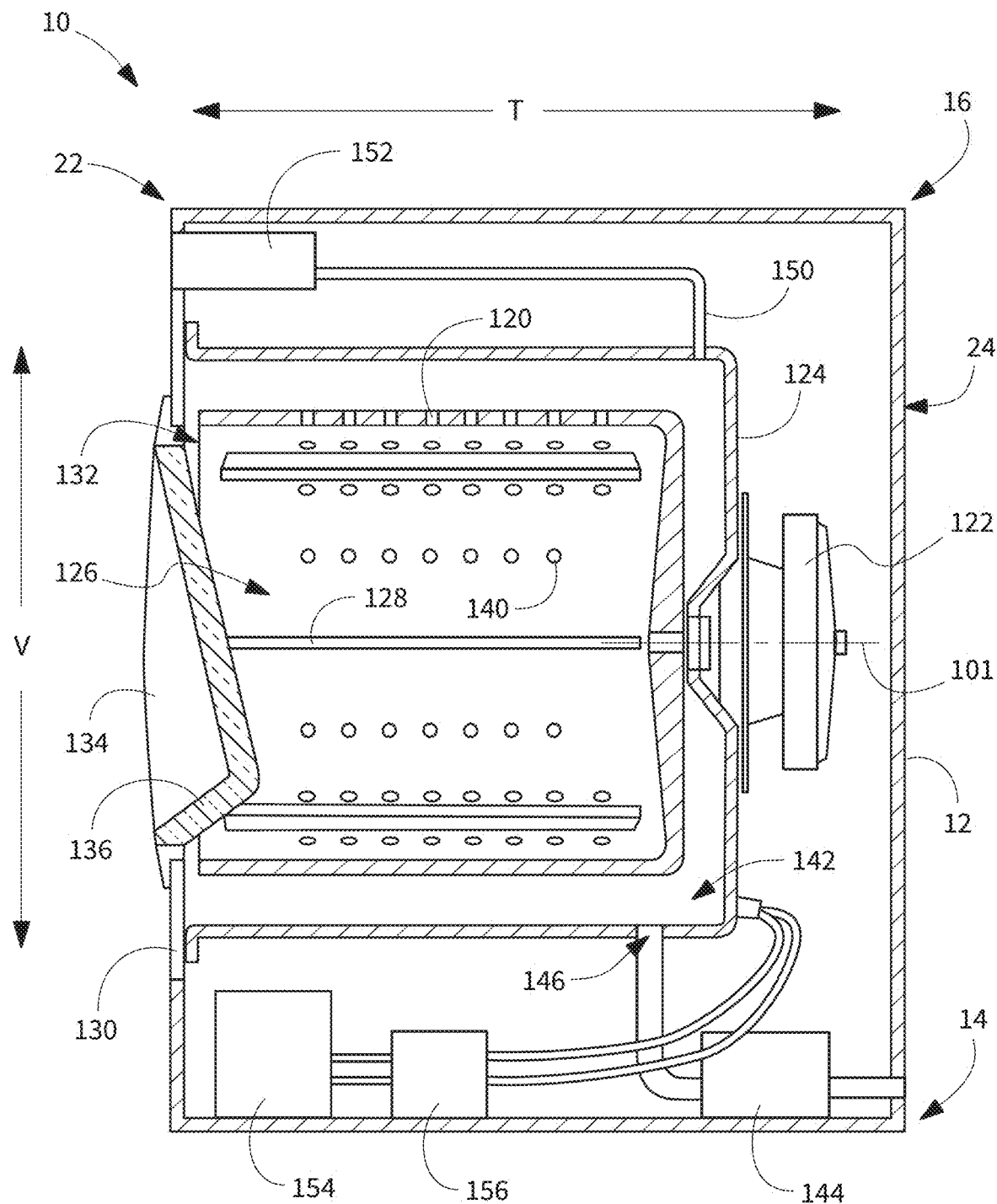
FIG. 2 provides a transverse cross-sectional view of the exemplary washing machine appliance of FIG. 1.
Figure 3:
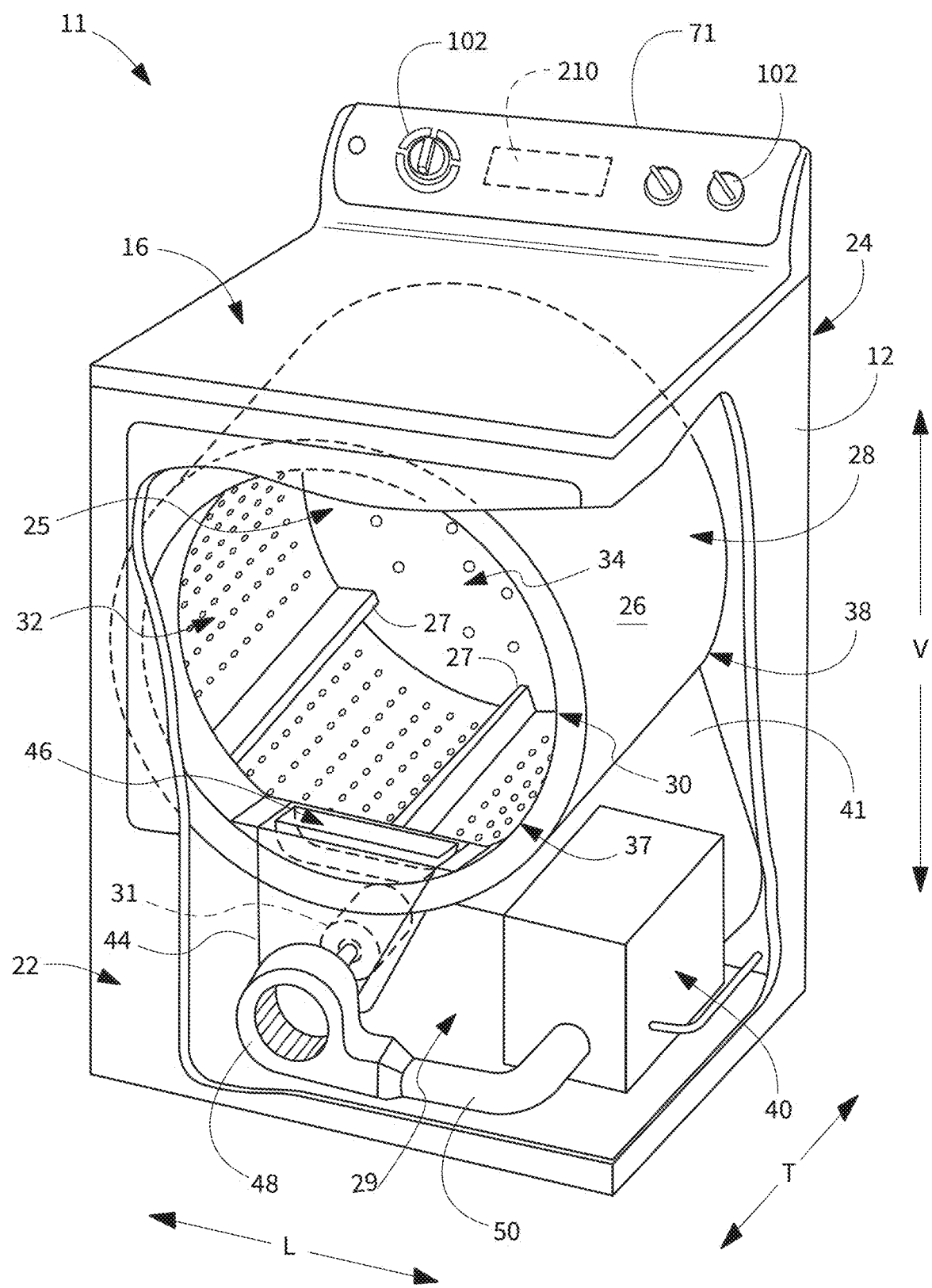
FIG. 3 provides a perspective view of the exemplary dryer appliance of FIG. 1 with portions of a cabinet of the dryer appliance removed to reveal certain components of the dryer appliance.

As may be seen in FIGS. 1 through 3, in accordance with one or more embodiments of the present subject matter, a group of at least two laundry appliances, e.g., a pair of laundry appliances, is provided.

As may be seen generally throughout FIGS. 1 through 3, a user interface panel 100 and a user input device 102 may be positioned on an exterior of each laundry appliance. The user input device 102 is generally positioned proximate to the user interface panel 100, and in some embodiments, the user input device 102 may be positioned on the user interface panel 100.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be a user input device in addition to or instead of the user input device 102.

Generally, each appliance may include a controller 210 in operative communication with the user input device 102. The user interface panel 100 and the user input device 102 may be in communication with the controller 210 via, for example, one or more signal lines or shared communication busses. Input/output ("I/O") signals may be routed between controller 210 and various operational components of the appliance. Operation of the appliance can be regulated by the controller 210 that is operatively coupled to the user interface panel 100. A user interface panel 100 may for example provide selections for user manipulation of the operation of an appliance, e.g., via user input device 102 and/or display 104. In response to user manipulation of the user interface panel 100 and/or user input device 102, the controller 210 may operate various components of the appliance. Controller 210 may include a memory and one or more microprocessors, CPUs or the like, such as general or special purpose microprocessors operable to execute programming instructions or micro-control code associated with operation of the appliance. The memory may represent random access memory such as DRAM, or read-only memory such as ROM or FLASH. In one embodiment, the processor executes programming instructions stored in memory. The memory may be a separate component from the processor or may be included onboard within the processor. Alternatively, a controller 210 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

As used herein, "processing device" or "controller" may refer to one or more microprocessors, microcontroller, application-specific integrated circuits (ASICS), or semiconductor devices and is not restricted necessarily to a single element. The controller 210 may be programmed to operate the laundry appliance, e.g., washing machine appliance 10 and/or dryer appliance 11, by executing instructions stored in memory (e.g., non-transitory media). The controller 56 may include, or be associated with, one or more memory elements such as RAM, ROM, or electrically erasable, programmable read only memory (EEPROM). For example, the instructions may be software or any set of instructions that when executed by the processing device, cause the processing device to perform operations. It should be noted that controllers as disclosed herein are capable of and may be operable to perform any methods and associated method steps as disclosed herein. For example, in some embodiments, methods disclosed herein may be embodied in programming instructions stored in the memory and executed by the controller 210.

The controller 210 may be programmed to operate the appliance by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions and/or instructions (e.g. performing the methods, steps, calculations and the like and storing relevant data as disclosed herein). It should be noted that controllers 210 as disclosed herein are capable of and may be operable to perform any methods and associated method steps as disclosed herein.

In some embodiments, for example, as illustrated in FIG. 1, the group, e.g., pair, of laundry appliances may include a washing machine appliance 10 and a dryer appliance 11. The group of laundry appliances may include two laundry appliances, e.g., as illustrated in FIG. 1, or may include more than two laundry appliances, such as multiple washer and dryer pairs, two or more washing machine appliances, two or more dryer appliances, or any other number of two or more laundry appliances in various combinations of washing machine appliances and/or dryer appliances.

In embodiments such as illustrated in FIG. 1, the user input device 102 of each appliance 10 and 11 may be positioned on the user interface panel 100. The embodiment illustrated in FIG. 1 also includes a display 104 on the user interface panel 100 of each household appliance 10 and 11.

As generally seen throughout FIGS. 1 through 3, in at least some embodiments, each laundry appliance 10 and 11 includes a cabinet 12 which defines a vertical direction V and a lateral direction L that are mutually perpendicular. Each cabinet 12 extends between a top side 16 and a bottom side 14 along the vertical direction V. Each cabinet 12 also extends between a left side 18 and a right side 20, e.g., along the lateral direction L. As may be seen, e.g., in FIGS. 2 and 3, each laundry appliance 10 and 11, e.g., the cabinet 12 thereof, may also define a transverse direction T which is mutually perpendicular to each of the vertical direction V and the lateral direction L.

Additional exemplary details of the laundry appliances are illustrated in FIGS. 2 and 3. For example, FIG. 2 provides a cross-sectional view of the exemplary washing machine appliance 10. As illustrated in FIG. 2, a wash tub 124 is non-rotatably mounted within cabinet 12. As may be seen in FIG. 2, the wash tub 124 defines a central axis 101. In the example embodiment illustrated by FIG. 2, the central axis 101 may be oriented generally along or parallel to the transverse direction T of the washing machine appliance 10. Accordingly, the washing machine appliance 10 may be referred to as a horizontal axis washing machine.

Referring again to FIG. 2, a wash basket 120 is rotatably mounted within the tub 124 such that the wash basket 120 is rotatable about an axis of rotation, which generally coincides with central axis 101 of the tub 124. A motor 122, e.g., such as a pancake motor, is in mechanical communication with wash basket 120 to selectively rotate wash basket 120 (e.g., during an agitation or a rinse cycle of washing machine appliance 10). Wash basket 120 defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. The wash basket 120 and the tub 124 may collectively define at least a portion of a tub assembly for the washing machine appliance 10.

Wash basket 120 may define one or more agitator features that extend into wash chamber 126 to assist in agitation and cleaning of articles disposed within wash chamber 126 during operation of washing machine appliance 10. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 12 also includes a front panel 130 which defines an opening 132 that permits user access to wash basket 120 within wash tub 124. More specifically, washing machine appliance 10 includes a door 134 that is positioned in front of opening 132 and is rotatably mounted to front panel 130. Door 134 is rotatable such that door 134 permits selective access to opening 132 by rotating between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 10. Door 134 also includes a handle (not shown) that, e.g., a user may pull when opening and closing door 134. Further, although door 134 is illustrated as mounted to front panel 130, it should be appreciated that door 134 may be mounted to another side of cabinet 12 or any other suitable support according to alternative embodiments.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 10. For example, during operation of washing machine appliance 10, wash fluid may be urged by gravity from basket 120 to sump 142 through plurality of perforations 140. A pump assembly 144 is located beneath tub 124 for gravity assisted flow when draining tub 124, e.g., via a drain 146. Pump assembly 144 may be configured for recirculating wash fluid within wash tub 124.

A spout 150 is configured for directing a flow of fluid into wash tub 124. For example, spout 150 may be in fluid communication with a water supply (not shown) in order to direct fluid (e.g., clean water) into wash tub 124. Spout 150 may also be in fluid communication with the sump 142. For example, pump assembly 144 may direct wash fluid disposed in sump 142 to spout 150 in order to circulate wash fluid in wash tub 124.

As illustrated in FIG. 2, a detergent drawer 152 is slidably mounted within front panel 130. Detergent drawer 152 receives a wash additive (e.g., detergent, fabric softener, bleach, or any other suitable liquid or powder) and directs the fluid additive to wash chamber 124 during operation of washing machine appliance 10. According to the illustrated embodiment, detergent drawer 152 may also be fluidly coupled to spout 150 to facilitate the complete and accurate dispensing of wash additive.

Additionally, a bulk reservoir 154 is disposed within cabinet 12. Bulk reservoir 154 is also configured for receipt of fluid additive for use during operation of washing machine appliance 10. Bulk reservoir 154 is sized such that a volume of fluid additive sufficient for a plurality or multitude of wash cycles of washing machine appliance 10 (e.g., five, ten, twenty, fifty, or any other suitable number of wash cycles) may fill bulk reservoir 154. Thus, for example, a user can fill bulk reservoir 154 with fluid additive and operate washing machine appliance 10 for a plurality of wash cycles without refilling bulk reservoir 154 with fluid additive. A reservoir pump 156 is configured for selective delivery of the fluid additive from bulk reservoir 154 to wash tub 124.

During operation of washing machine appliance 10, e.g., during a wash cycle of the washing machine appliance 10, laundry items are loaded into wash basket 120 through opening 132, and washing operation is initiated through operator manipulation of input selectors 102. Wash tub 124 is filled with water, detergent, and/or other fluid additives, e.g., via spout 150 and/or detergent drawer 152. One or more valves (not shown) may be controlled by washing machine appliance 10 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a spin cycle, basket 120 is rotated at relatively high speeds. After articles disposed in wash basket 120 are cleaned and/or washed, the user can remove the articles from wash basket 120, e.g., by opening door 134 and reaching into wash basket 120 through opening 132.

While described in the context of a specific embodiment of horizontal axis washing machine appliance 10, using the teachings disclosed herein it will be understood that horizontal axis washing machine appliance 10 is provided by way of example only. It should be appreciated that the present subject matter is not limited to any particular style, model, or configuration of washing machine appliance. Other washing machine appliances having different configurations, different appearances, and/or different features may also be utilized with the present subject matter as well, e.g., vertical axis washing machine appliances.

FIG. 3 provides a perspective view of the dryer appliance 11 of FIG. 1, which is an example embodiment of a laundry appliance, with a portion of a cabinet or housing 12 of dryer appliance 11 removed in order to show certain components of dryer appliance 11. Dryer appliance 11 generally defines a vertical direction V, a lateral direction L, and a transverse direction T, each of which is mutually perpendicular, such that an orthogonal coordinate system is defined. While described in the context of a specific embodiment of dryer appliance 11, using the teachings disclosed herein, it will be understood that dryer appliance 11 is provided by way of example only. Other dryer appliances having different appearances and different features may also be utilized with the present subject matter as well.

Cabinet 12 includes a front side 22 and a rear side 24 spaced apart from each other along the transverse direction T. Within cabinet 12, an interior volume 29 is defined. A drum or container 26 is mounted for rotation about a substantially horizontal axis within the interior volume 29. Drum 26 defines a chamber 25 for receipt of articles of clothing for tumbling and/or drying. Drum 26 extends between a front portion 37 and a back portion 38. Drum 26 also includes a back or rear wall 34, e.g., at back portion 38 of drum 26. A supply duct 41 may be mounted to rear wall 34 and receives heated air that has been heated by a heating assembly or system 40.

A motor 31 is provided in some embodiments to rotate drum 26 about the horizontal axis, e.g., via a pulley and a belt (not pictured). Drum 26 is generally cylindrical in shape, having an outer cylindrical wall 28 and a front flange or wall 30 that defines an opening 32 of drum 26, e.g., at front portion 37 of drum 26, for loading and unloading of articles into and out of chamber 25 of drum 26. A plurality of lifters or baffles 27 are provided within chamber 25 of drum 26 to lift articles therein and then allow such articles to tumble back to a bottom of drum 26 as drum 26 rotates. Baffles 27 may be mounted to drum 26 such that baffles 27 rotate with drum 26 during operation of dryer appliance 11.

The rear wall 34 of drum 26 may be rotatably supported within the cabinet 12 by a suitable fixed bearing. Rear wall 34 can be fixed or can be rotatable. Rear wall 34 may include, for instance, a plurality of holes that receive hot air that has been heated by heating system 40. The heating system 40 may include, e.g., a heat pump, an electric heating element, and/or a gas heating element (e.g., gas burner). Moisture-laden, heated air is drawn from drum 26 by an air handler, such as blower fan 48, which generates a negative air pressure within drum 26. The moisture-laden heated air passes through a duct 44 enclosing screen filter 46, which traps lint particles. As the air passes from blower fan 48, it enters a duct 50 and then is passed into heating system 40. In some embodiments, the dryer appliance 11 may be a conventional dryer appliance, e.g., the heating system 40 may be or include an electric heating element, e.g., a resistive heating element, or a gas-powered heating element, e.g., a gas burner. In other embodiments, the dryer appliance may be a condensation dryer, such as a heat pump dryer. In such embodiments, heating system 40 may be or include a heat pump including a sealed refrigerant circuit. Heated air (with a lower moisture content than was received from drum 26), exits heating system 40 and returns to drum 26 by duct 41. After the clothing articles have been dried, they are removed from the drum 26 via opening 32. A door (FIG. 1) provides for closing or accessing drum 26 through opening 32.

In some embodiments, one or more selector inputs 102, such as knobs, buttons, touchscreen interfaces, etc., may be provided or mounted on the cabinet 12 (e.g., on a backsplash 71) and are in operable communication (e.g., electrically coupled or coupled through a wireless network band) with the processing device or controller 210. Controller 210 may also be provided in operable communication with components of the dryer appliance 11 including motor 31, blower 48, or heating system 40. In turn, signals generated in controller 210 direct operation of motor 31, blower 48, or heating system 40 in response to the position of inputs 102.

Figure 4:
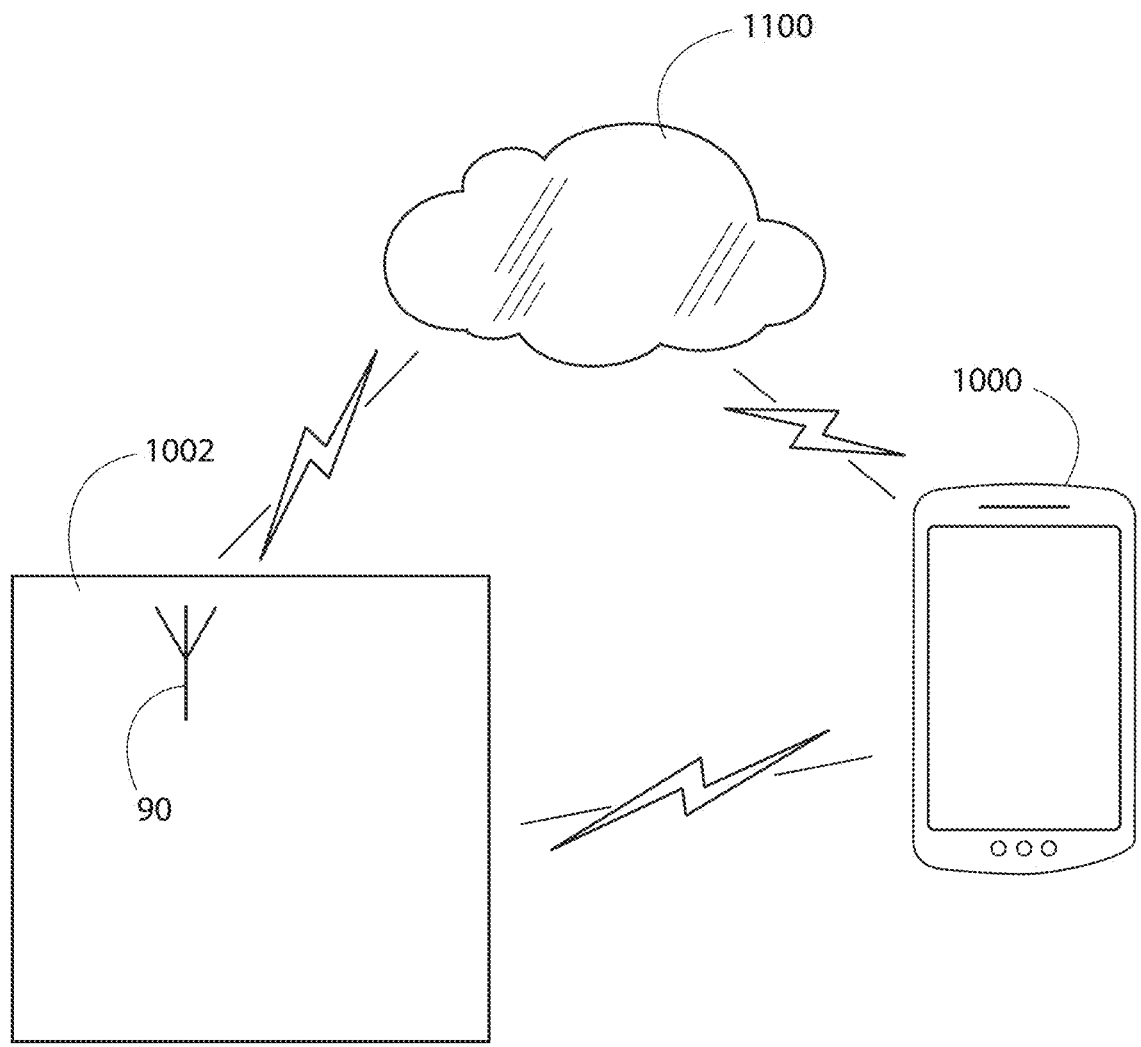
FIG. 4 provides a schematic diagram of a laundry appliance in communication with a remote user interface device and a remote database according to one or more embodiments of the present disclosure.

Turning now to FIG. 4, a general schematic is provided of a laundry appliance 1002 and communication features thereof. The laundry appliance 1002 schematically illustrates in FIG. 4 may be, for example, one of the laundry appliances 10 or 11 of FIGS. 1 through 3, among other possible example laundry appliances. The laundry appliance 1002 communicates wirelessly with a remote user interface device 1000 and a remote database 1100. For example, as illustrated in FIG. 4, the laundry appliance 1002 may include an antenna 90 by which the laundry appliance 1002 communicates with, e.g., sends and receives signals to and from, the remote user interface device 1000 and/or remote database 1100. The laundry appliance 1002 may communicate with the remote user interface device 1000 over a direct wireless communication link or over an indirect wireless communication link, such as via a remote server, a network, or cloud 1100. The remote user interface device 1000 may be a laptop computer, smartphone, tablet, personal computer, wearable device, smart home system, and/or various other suitable devices.

The laundry appliance 1002 may be in communication with the remote user interface device 1000 device through various possible communication connections and interfaces. The laundry appliance 1002 and the remote user interface device 1000 may be matched in wireless communication, e.g., connected to the same wireless network. The laundry appliance 1002 may communicate with the remote user interface device 1000 via short-range radio such as BLUETOOTH® or any other suitable wireless network having a layer protocol architecture. As used herein, "short-range" may include ranges less than about ten meters and up to about one hundred meters. For example, the wireless network may be adapted for short-wavelength ultra-high frequency (UHF) communications in a band between 2.4 GHz and 2.485 GHz (e.g., according to the IEEE 802.15.1 standard). In particular, BLUETOOTH® Low Energy, e.g., BLUETOOTH® Version 4.0 or higher, may advantageously provide short-range wireless communication between the appliance 1002 and the remote user interface device 1000. For example, BLUETOOTH® Low Energy may advantageously minimize the power consumed by the exemplary methods and devices described herein due to the low power networking protocol of BLUETOOTH® Low Energy.

The remote user interface device 1000 is "remote" at least in that it is spaced apart from and not physically connected to the laundry appliance 1002, e.g., the remote user interface device 1000 is a separate, stand-alone device from the laundry appliance 1002 which communicates with the laundry appliance 1002 wirelessly. Any suitable device separate from the laundry appliance 1002 that is configured to provide and/or receive communications, information, data, or commands from a user may serve as the remote user interface device 1000, such as a smartphone (e.g., as illustrated in FIG. 4), smart watch, personal computer, smart home system, or other similar device. For example, the remote user interface device 1000 may be a smartphone operable to store and run applications, also known as "apps," and some or all of the method steps disclosed herein may be performed by a smartphone app.

The remote user interface device 1000 may include a memory for storing and retrieving programming instructions. Thus, the remote user interface device 1000 may provide a remote user interface which may be an additional user interface to the user interface panel 100 (FIG. 1). For example, the remote user interface device 1000 may be a smartphone operable to store and run applications, also known as "apps," and the remote user interface may be provided as a smartphone app.

As mentioned above, the laundry appliance 1002 may also be configured to communicate wirelessly with a remote database 1100. The remote database 1100 may be, e.g., a cloud-based data storage system. For example, the laundry appliance 1002 may communicate with the remote database 1100 over the Internet, which the laundry appliance 1002 may access via WI-FI®, such as from a WI-FI® access point in a user's home.

Figure 5:
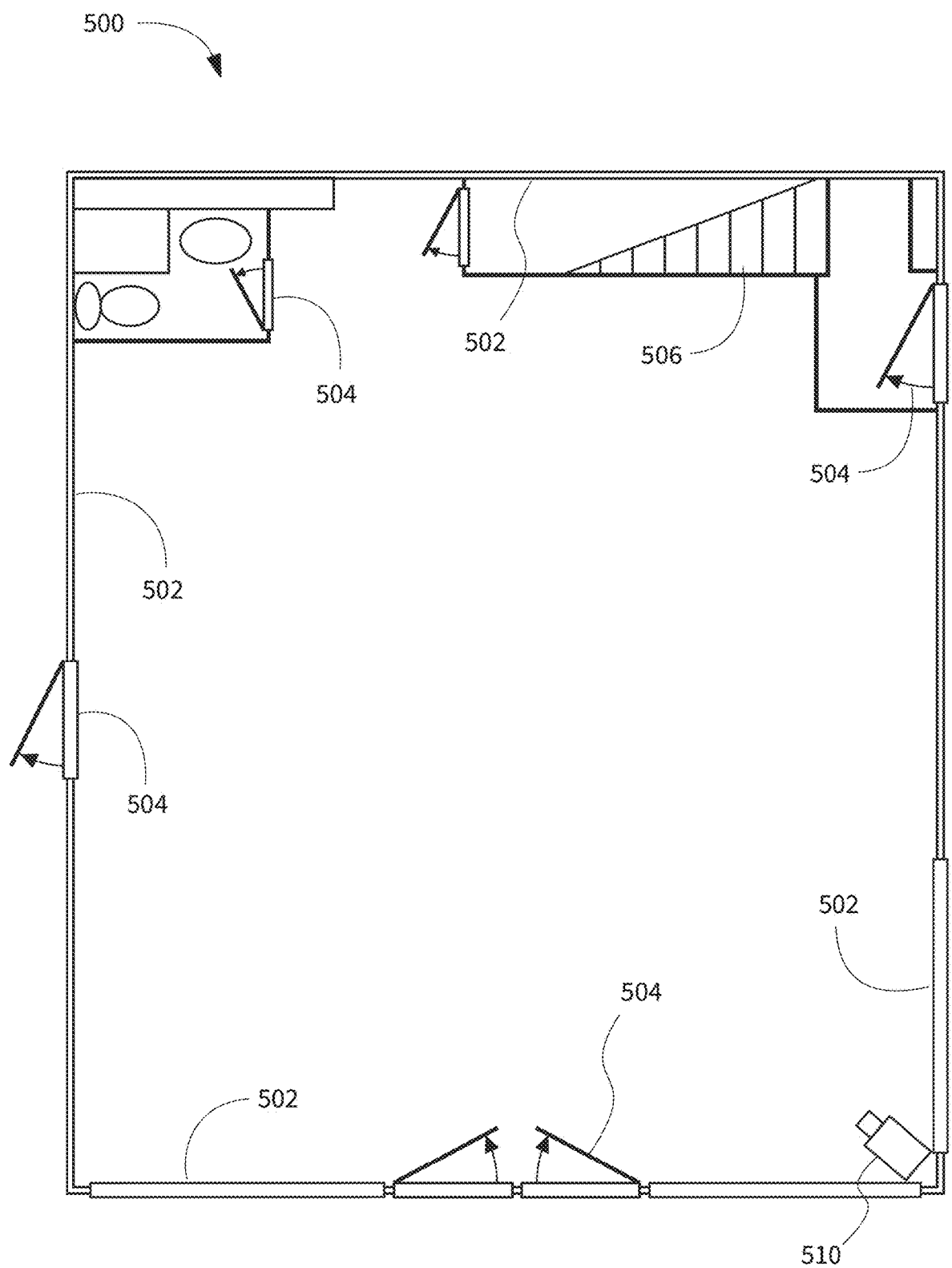
FIG. 5 provides an exemplary floor plan according to one or more embodiments of the present disclosure.

FIG. 5 illustrates an exemplary floor plan 500 of a room, such as a laundromat, which may be uploaded, e.g., by an owner of the laundromat, according to one or more embodiments of the present disclosure. The room represented by the floor plan 500 may also be, e.g., a laundry room in a dormitory or apartment complex, or any other room in which multiple laundry appliances may be located. For example, the floor plan 500 may be uploaded to a remote computing device, such as a database or server, e.g., via the internet. In some embodiments, the remote computing device may be part of a distributed computing environment, such as the cloud, the fog, and/or the edge. The floor plan 500 may be, for example, any suitable image file format, such as but not limited to a JPEG or PDF image file that is uploaded to the remote computing device, e.g., in the cloud, from a user interface device such as a smartphone, tablet computer, laptop or desktop computer, or other similar device.

As illustrated for example in FIG. 5, the floor plan 500 may include a general outline of the room, such as an indication of the location and size of walls 502 of the room and doors 504 therein. Additionally, as will be explained in further detail below, the room may include an imaging device 510. The floor plan 500 may also include, in some exemplary embodiments, a location of other elements or features of the room, such as stairs 506. Additionally, after or during the upload process for the floor plan, e.g., the upload process for the image file containing the floor plan, a prompt or input field may be provided for dimension data of the room, e.g., laundromat, that is represented by the floor plan 500. Thus, dimensions may also be input or uploaded and associated with the floor plan 500.

In embodiments where the dimensions of the laundromat are also uploaded, the floor plan 500 may be scaled correspondingly to the uploaded dimensions, e.g., the floor plan 500 may be scaled to fit a display of a user interface device and may be scaled proportionally to the uploaded dimensions. The uploaded dimensions may include or correspond to a length and a width of the laundromat, e.g., where the laundromat is rectangular. For example, the floor plan 500 may be scaled according to the uploaded dimensions such that the size of icons representing laundry appliances in the laundromat is proportional to the size of the floor plan 500, such as to ensure accurate locations of the laundry appliances within the room, e.g., laundromat, and accurate distances between the laundry appliances within the room. For example, the ratio or relative size of the floor plan 500 as displayed on a screen may be proportional to the actual dimensions (e.g., as uploaded) of the laundromat and laundry appliances which are also displayed on the screen may share the same ratio of actual dimensions to on-screen dimensions as the room, e.g., walls 502 thereof, in the floor plan 500.

After the floor plan 500 is uploaded, the floor plan 500 may be accessed and displayed on a user interface device, such as in an application, e.g., "app," running on a smartphone device, tablet computer, and/or other similar user interface device. As will be discussed further in regard to FIG. 6, commissioned laundry appliances may be displayed on or in the floor plan 500, e.g., in the app.

Figure 6:
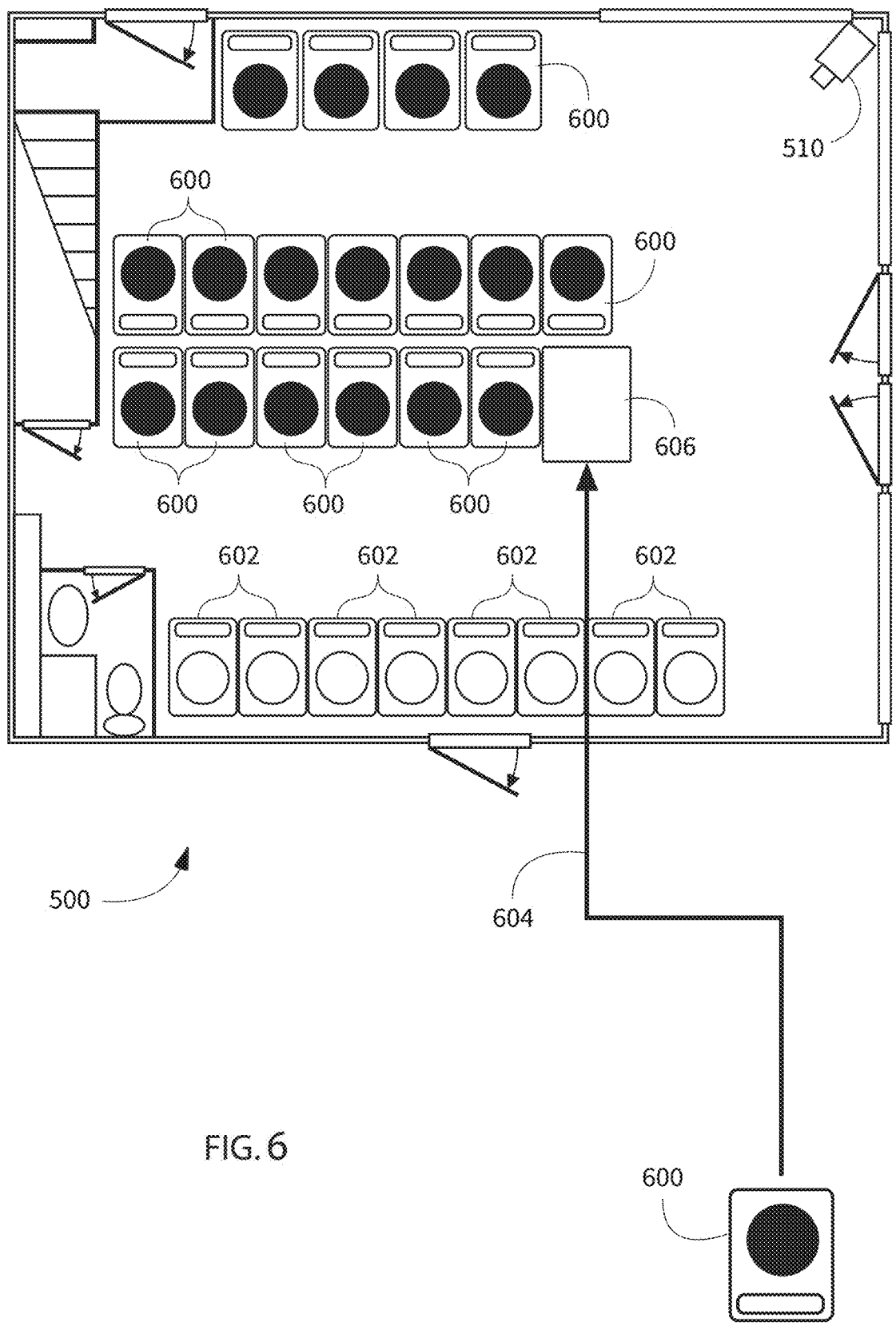
FIG. 6 illustrates populating the floor plan with location information for a group of laundry appliances according to one or more embodiments of the present disclosure.

Turning now to FIG. 6, in some embodiments, a plurality of laundry appliances, e.g., a plurality of washing machine appliances 10 and a plurality of dryer appliances 11, may be identified on the floor plan 500. The laundry appliances may be represented by icons, such as washing machine icons 600, each of which represents one washing machine appliance 10 and dryer icons 602, each of which represents one dryer appliance 11. For example, the plurality of laundry appliances may be manually entered or selected by the owner on the floor plan 500. In some embodiments, for example as illustrated in FIG. 6, each appliance may be added to the floor plan 500 by a drag-and-drop interface, e.g., as illustrated in FIG. 6, a washing machine appliance 10 may be added to the plurality of laundry appliances on the floor plan 500 by dragging a representative washing machine icon 600 onto the floor plan 500, e.g., as represented by arrow 604, and dropping the representative icon into place at the location 606 in the floor plan 500, while the floor plan 500 is displayed on the screen of the user interface device, and where location 606 on the floor plan 500 corresponds to the actual location of the washing machine appliance 10 in the room, e.g., laundromat, represented by the floor plan 500.

Figure 7:
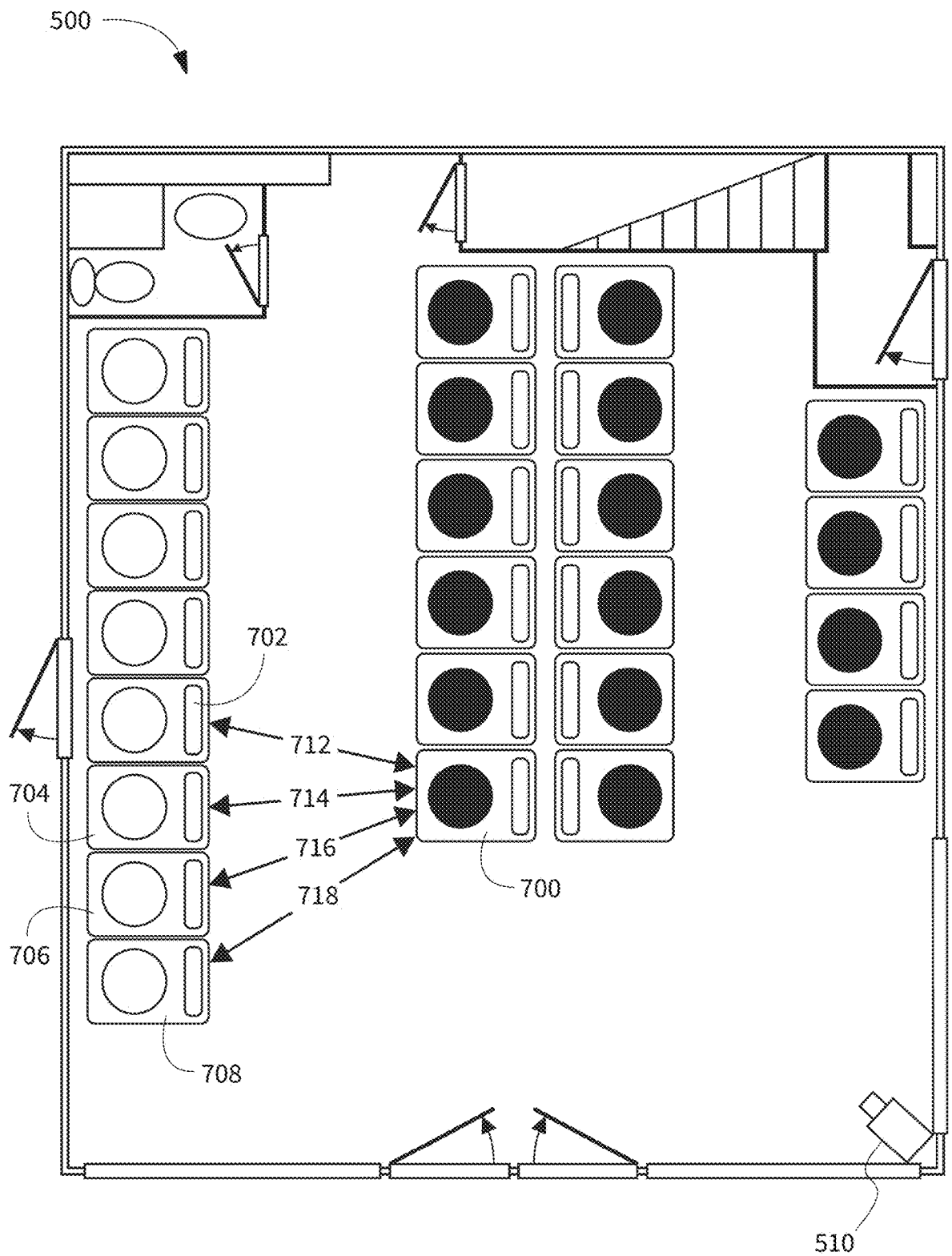
FIG. 7 provides a view of the floor plan of FIG. 6 with a group of laundry appliances added thereto.

In some embodiments, e.g., as illustrated in FIG. 7, the floor plan 500 and the location information of the laundry appliances therein may be used to determine or calculate distances between various laundry appliances, such as distances between each washing machine appliance 10 represented by a washing machine icon 600 and each dryer appliance 11 represented by a dryer appliance icon 602. For example, given a selected washing machine appliance, e.g., which is reserved by and/or in use by a user, e.g., customer, and which is represented by icon 700 in FIG. 7, the closest dryer appliance (as represented by dryer appliance icons 602 in floor plan 500, e.g., as noted in FIG. 6) to the selected washing machine appliance may be determined from the floor plan 500. As illustrated in FIG. 7, a first dryer appliance (as represented by icon 702 in the floor plan 500) may be a first distance 712 away from the selected washing machine appliance, a second dryer appliance (as represented by icon 704) may be a second distance 714 away from the selected washing machine appliance, a third dryer appliance (as represented by icon 706) may be a third distance 716 away from the selected washing machine appliance, and a fourth dryer appliance (as represented by icon 708) may be a fourth distance 718 away from the selected washing machine appliance, e.g., where the selected washing machine appliance is represented by icon 700. Additional distances may be determined from the floor plan 500 as well, such as from the selected washing machine appliance to any or all remaining dryer appliances and/or from other washing machine appliances to some or all of the dryer appliances.

Figure 8:
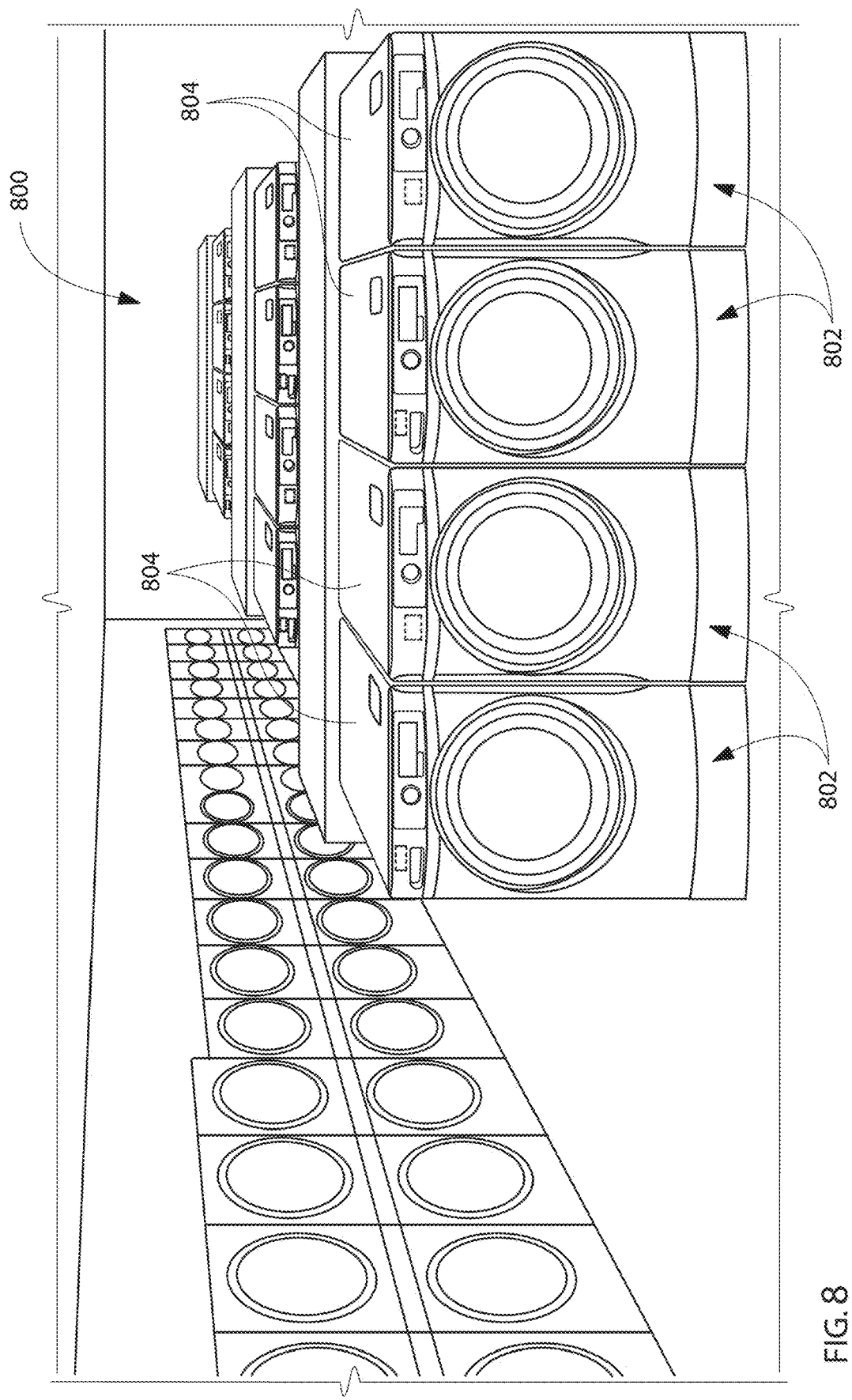
FIG. 8 provides an exemplary image of a room according to one or more embodiments of the present disclosure.

Turning now to FIG. 8, an exemplary image 800 of a room, which may be a still image or a live image of the room, is illustrated. The image 800 may be captured e.g., by an imaging device described in more detail below. In exemplary embodiments where the image is a live image, the image may be displayed, e.g., live or in real-time or near real time, on a display such as the display of the remote user interface device 1000. Thus, it is to be understood that a "live image" as used herein is intended to include images which are continuously updated in real time or with some delay and which may be updated at least about once per second, e.g., which have a refresh rate of 1 Hz or greater.

Figure 9:
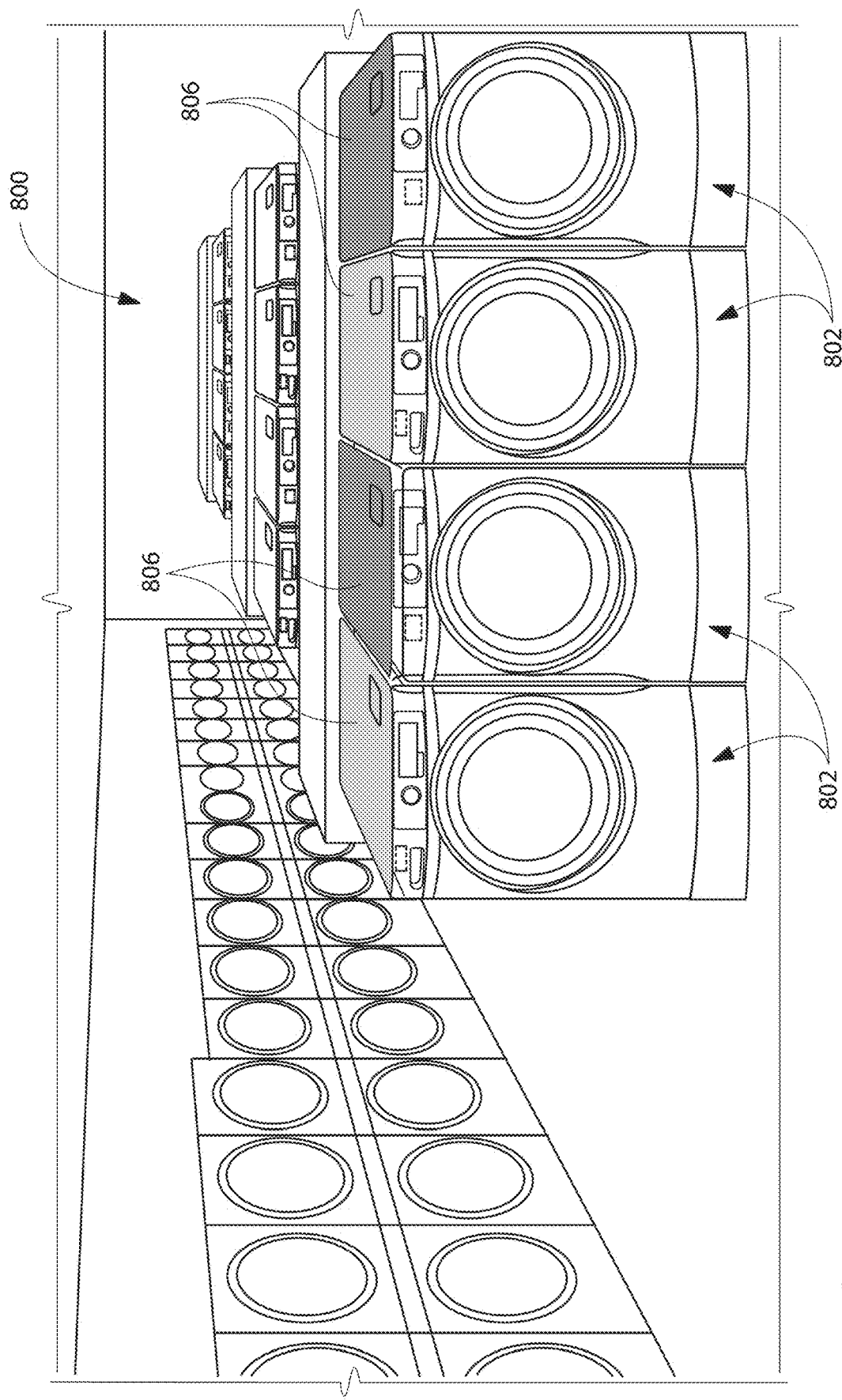
FIG. 9 illustrates identifying a laundry appliance from a group of laundry appliances.

In particular, the exemplary image 800 in FIGS. 8 and 9 includes or depicts at least a portion of a laundromat. In some embodiments, the image 800 may also include or depict other large rooms having a group of laundry appliances 802, e.g., a room in a dormitory or apartment complex. Moreover, as illustrated in FIG. 8, the image 800 of the room may depict the group of laundry appliances 802, e.g., a plurality of laundry appliances 10 and 11 as described above. As illustrated, each laundry appliance of the group of laundry appliances 802 may be matched with or assigned to a top area 804. In some embodiments, the top area 804 matched with each laundry appliance may be a top side of the laundry appliance, e.g., top side 16 of FIGS. 1 to 3, or a portion thereof. Additionally, in some instances, each laundry appliance may be matched with an additional surface, e.g., a counter or a shelf, adjacent to the top side of the laundry appliance. As such, the top area 804 matched with the laundry appliance may be or may include the surface adjacent to the top side of the laundry appliance. For example, the top area 804 matched with each laundry appliance may be a counter or a shelf that the laundry appliance is placed under or is otherwise adjacent to.

Further, as mentioned above, the image 800 of the room may be captured by an imaging device, such a camera, e.g., camera 510 as illustrated in FIGS. 5 through 7. It should be appreciated that the structure and operation of a camera are understood by those of ordinary skill in the art, and as such, the camera is not specifically illustrated or described in further detail herein for the sake of brevity and clarity.

In some embodiments, the imaging device may be a camera that continuously monitors and observes the room, such as a surveillance camera, e.g., which is mounted to a wall or ceiling, and which captures a live video stream of the room or an area therein. Thus, in some embodiments, the image 800 of the room may be a live image 800 of the room as described above, or may be a still image, such as a photograph or a portion, e.g., frame, of a live image or other image stream. Moreover, the imaging device may be mounted such that it has a field of view that encompasses the group of laundry appliances in the room, such as the field of view illustrated in FIGS. 8 and 9. In addition, the imaging device, and more particularly the field of view of the imaging device, may be stationary. As such, in some embodiments, the location of the laundry appliances in the image 800 may not change. In another embodiment, the imaging device may be a smartphone camera that may capture a single image 800 of the room. Thus, in some embodiments, the image 800 of the room may be a still image 800 of the room. As such, the image 800 of the room may be, for example, any suitable image or video format, such as but not limited to a JPEG image file, a PDF image file, or a MP4 video file that is taken by the imaging device.

Further, the image 800 of the room taken by the imaging device may be uploaded to a remote computing device, such as a database or server, e.g., via the internet. In some embodiments, the remote computing device may be part of a distributed computing environment, such as the cloud, the fog, and/or the edge. Additionally, after or during the upload process of the image 800 of the room, a prompt or input field may be provided for identifying a laundry appliance of the group of laundry appliances 802 in the image 800 of the room. The prompt or input field may be provided on a remote user interface device, such as the remote user interface device 1000 described above. In some embodiments, providing the prompt or input field may be a computer-implemented step, described in more detail below. For example, in some embodiments, the prompt or input field may be provided on a display, such as a touchscreen display, of a remote user interface device.

In some embodiments, after the image 800 of the room is uploaded, the image 800 of the room may be accessed and displayed on a user interface device, such as in an application, e.g., "app" running on a smartphone device, tablet computer, and/or other similar user interface device. As will be discussed further in regard to FIG. 9, a laundry appliance of the laundry appliances 802 may be identified on or in the image 800 of the room e.g., in the app.

Turning now to FIG. 9, identifying a laundry appliance of the group of laundry appliances 802 in the image 800 of the room may include receiving an input that associates the top area 804 with the location information, e.g., location information in the floor plan 500 of FIG. 7, of one or more laundry appliances in the group of laundry appliances, such as each laundry appliance. In some embodiments, the input received may be a mark 806 on or in the image 800 of the room that associates the top area 804 assigned to a particular laundry appliance with the location information of that laundry appliance. For example, the input may associate the top area 804 of the laundry appliance with the location information of the laundry appliance by linking the top area 804 to a laundry appliance that has been commissioned e.g., in the app. As such, specific location information for one or more of the laundry appliances may be provided, e.g., a location within an area or room, such as the location of the top area 804 assigned to each laundry appliance in the room may be provided, e.g., to a user.

Further, mark 806 may be a digital input, e.g., that a user may manually enter or select on the remote user interface device, while the remote user interface device is running an app which causes the remote user interface device to display the image 800 on a display screen of the remote user interface device. For example, in various embodiments, the manual input received at the remote user interface device may be or include a touch or swipe on a touchscreen of a smartphone or tablet, or a click and drag input using an input device such as a mouse, or other similar inputs.

In such embodiments, the mark 806 may be generated by the remote user interface device in response to the digital input and the image on the display screen of the remote user interface device may be updated to include the mark 806, e.g., as an overlay on the image 800 received from the imaging device or a composite image including the mark 806 generated based on the user input and the image 800 received from the imaging device. For example, as illustrated in FIG. 9, the top area 804 of each laundry appliance has been digitally marked e.g., in the app, by applying digital mark 806. It should be appreciated that digital mark 806 may be applied using any suitable interface. For example, in some embodiments, the mark 806 may be a digital mark 806 applied via a paint fill interface. The paint fill interface may be an interface that allows a user to digitally mark an area of an image by adding paint strokes or filling the area with a color.

Figure 10:
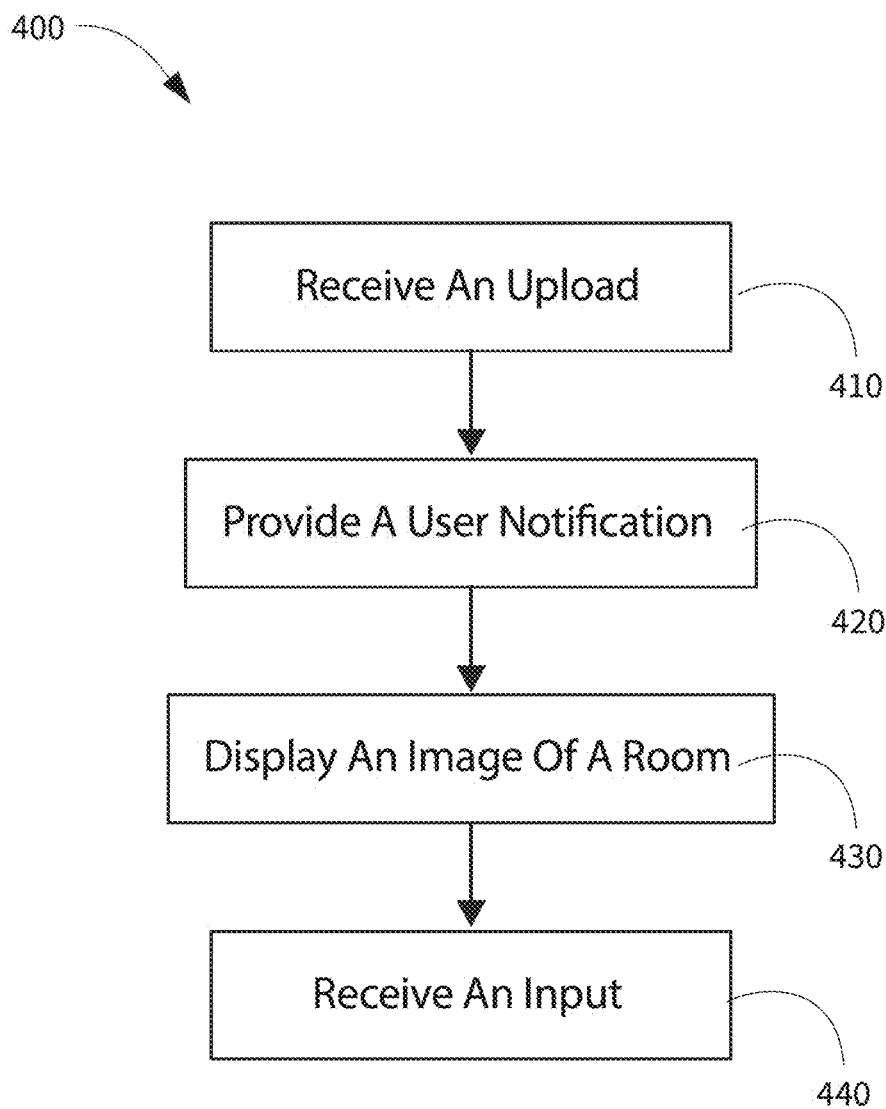
FIG. 10 provides a flowchart illustrating an example method of identifying a group of laundry appliances according to one or more embodiments of the present disclosure.

As illustrated in FIG. 10, embodiments of the present disclosure also include methods of identifying a laundry appliance of a group of laundry appliances, e.g., laundry appliances 10 and 11 described above, among other possible exemplary laundry appliances. Exemplary methods according to the present subject matter include the method 400 illustrated in FIG. 10. Such methods may be wholly or partially computer-implemented, such as implemented by a controller, e.g., controller 210, of one or more laundry appliances and/or implemented by one or more remote computing devices, e.g., in the cloud, fog, and/or edge. Further, such computer-implemented method steps or algorithms may be performed locally or may be distributed, where "locally" may include steps or processes performed by a single device alone, e.g., controller 210, and where "distributed" means some steps performed locally and other steps performed on a separate device, e.g., in the cloud, fog, and/or edge.

As illustrated in FIG. 10, the method 400 may include a step 410 of receiving an upload. In some embodiments, the upload received at step 410 may be or include a floor plan of a room. The floor plan may include location information of each laundry appliance of the group of laundry appliances. In some embodiments, the upload including the floor plan may be sent to and received by a remote computing device, and the location of each laundry appliance may be added to the floor plan, either before or after transmitting the upload. For example, the location may be added via a user interface including icons which represent locations of washing machine appliances and dryer appliances of the group of laundry appliances within the room represented by the floor plan. For example, the location information may be added to the floor plan after the floor plan is scaled based on the actual dimensions of the room, e.g., whereby the icons representing each laundry appliance may be appropriately proportioned relative to the overall floor plan and to each other, such as with respect to distances between each laundry appliance. In some embodiments, the floor plan may be received after the dimensions are entered and the appliance location information is reviewed, or the scaling and locating may be performed, in whole or in part, using the remote computing device after the upload of the basic floor plan ("basic" as used here refers to the floor plan without the laundry appliance location information) on the remote computing device.

Method 400 may further include a step 420 of providing a user notification. In some embodiments, step 420 includes providing a user notification in response to receiving the upload e.g., the upload in step 410. In some embodiments, the user notification may be provided on a remote user interface device, such as the remote user interface device 1000 described above. In addition, in some embodiments, the user notification may include a prompt to assign an area to a laundry appliance in an image of a room e.g., in a laundromat, dormitory, or apartment complex. For example, the user notification may include a prompt to assign a top area to each laundry appliance in the image of the room.

As illustrated in FIG. 10, method 400 may further include a step 430 of displaying an image. In some embodiments, step 430 includes displaying an image of the room in response to an affirmative action to the user notification. In some embodiments, the image of the room may be an image taken by an imaging device, such as the imaging device described above. For example, the image 800 of FIGS. 8 and 9 of the room may be displayed on the remote user interface device, in response to an affirmative action to the user notification.

Method 400 may then include a step 440 of receiving an input. In some embodiments, the input received at step 440 includes an association of the laundry appliance in the image of the room with the location information of the laundry appliance, e.g., the location information of the laundry appliance in a floor plan, such as floor plan 500.

Further, in some embodiments, the input received associates the laundry appliance based on a top area assigned to the laundry appliance in the image of the room. For example, the top area of the laundry appliance may be the top side of the laundry appliance or a surface adjacent to the top side of the laundry appliance. In addition, in some embodiments, the input received is a mark e.g., mark 806 described above on the image of the room that associates the top area assigned to the laundry appliance with the location information of the laundry appliance.

Figure 11:
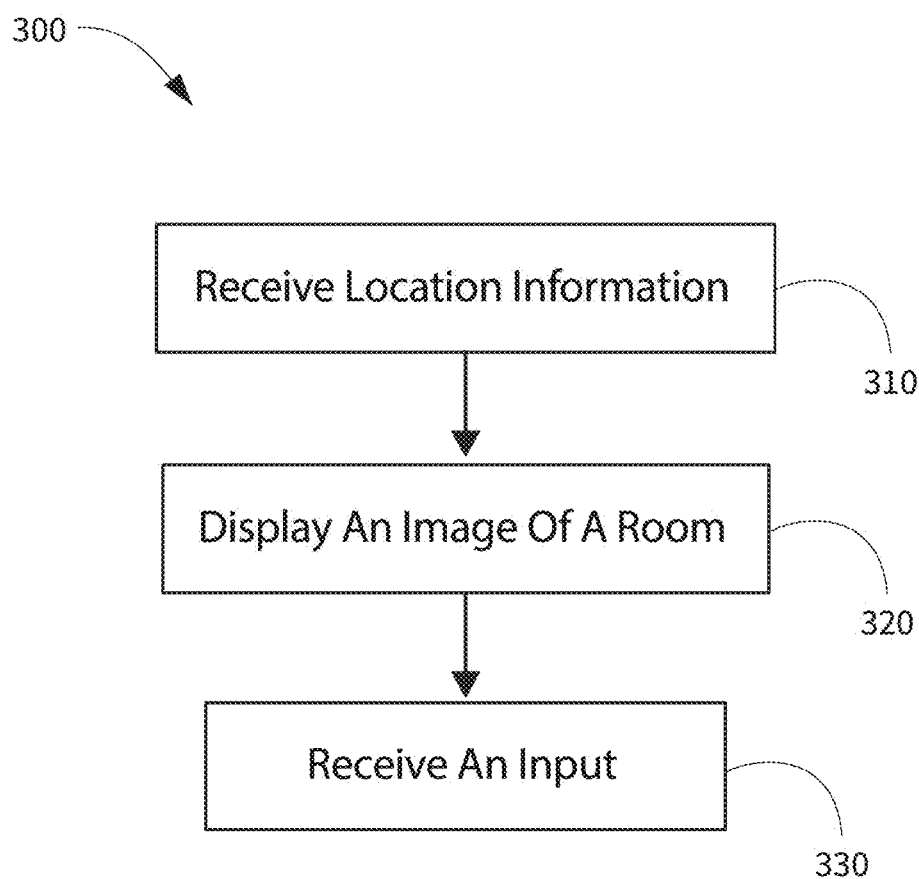
FIG. 11 provides a flowchart illustrating another example method of identifying a group of laundry appliances according to one or more additional embodiments of the present disclosure.

Turning now to FIG. 11, another exemplary method 300 of identifying a laundry appliance of a group of laundry appliances is provided. The group of laundry appliances may include one or more washing machine appliances and one or more dryer appliances. The method 300 may include a step 310 of receiving location information. In some embodiments, step 310 may include receiving location information for each laundry appliance of the group of laundry appliances located in the room. Further, in some embodiments, step 310 of receiving location information may include receiving an upload including a floor plan of a room, the floor plan of the room including location information for each laundry appliance of the group of laundry appliances. In some embodiments, receiving the upload may further include receiving, by a remote computing device, dimensions of the room, and scaling the floor plan and the location information for each laundry appliance based on the dimensions. Further, in some embodiments, the step 310 may further include providing a user notification, on the remote user interface device, in response to receiving the location information for each laundry appliance. In addition, the user notification may include a prompt to assign a top area to each laundry appliance of the group of laundry appliances.

Method 300 may further include a step 320 of displaying an image. In some embodiments, displaying an image of the room may include displaying an image of the room on a remote user interface device. In some embodiments, the image of the room may be an image taken by an imaging device, such as the imaging device described above. For example, at step 320 an image of the room described above may be displayed on the remote user interface device 1000 described above. Further, in some embodiments, displaying the image of the room may be performed in response to an affirmative action to the user notification, e.g., the user notification of step 310. For example, the image of the room may be displayed in response to an affirmative action to the prompt of the user notification.

As illustrated in FIG. 11, method 300 may further include a step 330 of receiving an input. In some embodiments, the input may include an association of the laundry appliance in the image of the room with the location information e.g., location information provided by a floor plan, such as floor plan 500 described above, of the laundry appliance. Further, in some embodiments, the input received associates the laundry appliance based on a top area, e.g., top area 804 described above, of the laundry appliance in the image of the room. More particularly, the association may include identifying the laundry appliance in the floor plan and assigning the top area to the identified laundry appliance in the image of the room. For example, the input received may be a mark on the image of the room that associates the top area assigned to the laundry appliance with the location information of the laundry appliance. In addition, the top area assigned to the laundry appliance may be a top side of the laundry appliance or a surface adjacent to the top side of the laundry appliance.

For example, in methods according to the present disclosure, such as method 300 and/or 400, the group of laundry appliances may be commissioned and, during or after the commissioning process, location information of each laundry appliance in the group of laundry appliances may be added to the floor plan. In such embodiments, the group of laundry appliances may include, for example, washing machine appliance A in location X, washing machine appliance B in location Y, dryer appliance C in location Z, etc., where the exemplary locations X, Y, and Z may be locations within a room and may be entered via an interface including a floor plan of the room and/or may be displayed as part of the floor plan of the room. Further, the top area assigned to each laundry appliance based on the image of the room may be coordinated with the location information for each laundry appliance from the floor plan. Continuing the example, a first top area in the image may be assigned to washing machine appliance A in location X, a second top area in the image may be assigned to washing machine appliance B in location Y, a third top area in the image may be assigned to dryer appliance C in location Z, and so on.

It should be appreciated that in some embodiments, the floor plan provided may generally be a two dimensional depiction of the room, e.g., as to make the commissioning process simpler. However, the image of the room provided by the imaging device may be a three dimensional depiction of the room that provides a more detailed, more accurate, and more robust depiction of the room. It should be appreciated that "three dimensional" as used herein refers to the information depicted in the image of the room including three dimensions or representing three dimensions (while the image itself is a two-dimensional image). For example, as illustrated in FIGS. 8 and 9, the information depicted in the image of the room includes three dimensions. As such, in some embodiments, at step 330 the association may include information from the two dimensional floor plan and the three dimensional image of the room.

Referring now generally to FIGS. 10 and 11, the methods 400 and/or 300 may be interrelated and/or may have one or more steps from one of the methods 400 and 300 combined with the other method 400 or 300. Thus, those of ordinary skill in the art will recognize that the various steps of the exemplary methods described herein may be combined in various ways to arrive at additional embodiments within the scope of the present disclosure.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

In some embodiments, one or more methods according to the present disclosure may be computer-implemented, such as implemented at least in part by a remote computing device, e.g., in a distributed computing environment such as the cloud, fog, and/or edge, as mentioned above. Such embodiments may also include one or more steps performed by a remote user interface device which is in communication with the remote computing device, where the remote user interface device and the remote computing device are both remote from the laundry appliances, e.g., as described above with respect to FIG. 4, and are remote from each other.

Embodiments of the present disclosure may advantageously provide an improved user experience, such as an improved user interface which includes more updated and useful information, e.g., a user interface, such as in a laundry app on a smartphone or similar device, which includes location information for a group of laundry appliances. For example, such improved user interfaces may permit a user, e.g., an owner of a laundromat, to identify a top area of a laundry appliance in an image of the room and associate the identified top area with exact location information of the laundry appliance. Such interfaces may be advantageous, for example, as compared to a user interface which provides more limited information, e.g., only identifying information such as generalized name or number or otherwise lacking current status and/or relative proximity information, for dryer appliances in the same room as a washing machine. In some exemplary embodiments, such improved interfaces may include a depiction of the room e.g., an image of the room taken by an imaging device. The depiction of the room may be presented e.g., on a display of a remote user interface device, such as a touchscreen display, computer monitor, etc. Thus, the improved user interface may present information e.g., location of the top area of a laundry appliance in a room, in a visual form.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of identifying a laundry appliance of a group of laundry appliances, the method comprising:
   receiving an upload comprising a floor plan of a room, the group of laundry appliances located in the room, the floor plan comprising location information of each laundry appliance;
   providing a user notification, on a remote user interface device, in response to receiving the upload, wherein the user notification comprises a prompt to assign a top area to each laundry appliance of the group of laundry appliances;
   displaying, on the remote user interface device, an image in real time of the room in response to an affirmative action to the user notification, wherein the image of the room is taken by an imaging device; and
   receiving an input, on the remote user interface device, indicative of an association of the laundry appliance in the image of the room with the location information of the laundry appliance comprised in the floor plan, wherein the input received associates the laundry appliance based on a top area assigned to the laundry appliance in the image of the room, displaying the location information of the laundry appliance in the image of the room.

2. The method of claim 1, wherein the input received comprises a mark on the image of the room that associates the top area assigned to the laundry appliance with the location information of the laundry appliance.

3. The method of claim 1, wherein the top area assigned to the laundry appliance comprises a top side of the laundry appliance.

4. The method of claim 1, wherein receiving the upload further comprises receiving, by a remote computing device, dimensions of the room, and scaling the floor plan and the location information for each laundry appliance based on the dimensions.

5. The method of claim 4, wherein the upload is received by a remote computing device.

6. A remote user interface device of identifying a laundry appliance of a group of laundry appliances, the user interface device comprising:
   a processor performing operation of:
   uploading a floor plan of a room, the group of laundry appliances located in the room, the floor plan comprising location information of each laundry appliance;
   providing a user notification, on a display the remote user interface device, in response to the uploading, wherein the user notification comprises a prompt to assign a top area to each laundry appliance of the group of laundry appliances;
   displaying, on the remote user interface device, an image in real time of the room in response to an affirmative action to the user notification, wherein the image of the room is taken by an imaging device; and
   receiving an input, on the remote user interface device, indicative of an association of the laundry appliance in the image of the room with the location information of the laundry appliance comprised in the floor plan, wherein the input received associates the laundry appliance based on a top area assigned to the laundry appliance in the image of the room, displaying the location information of the laundry appliance in the image of the room.

7. The remote user interface device of claim 6, wherein the input received comprises a mark on the image of the room that associates the top area assigned to the laundry appliance with the location information of the laundry appliance.

8. The remote user interface device of claim 6, wherein the top area assigned to the laundry appliance comprises a top side of the laundry appliance.

9. The remote user interface device of claim 6, wherein receiving the upload further comprises receiving, by a remote computing device, dimensions of the room, and scaling the floor plan and the location information for each laundry appliance based on the dimensions.

10. The remote user interface device of claim 6, wherein the upload is received by a remote computing device.

* * * * *